US008620493B2

(12) United States Patent
Hughes et al.

(10) Patent No.: US 8,620,493 B2
(45) Date of Patent: Dec. 31, 2013

(54) ELECTRIC TAXI AUTO-GUIDANCE AND CONTROL SYSTEM

(75) Inventors: Keith Hughes, Peoria, AZ (US); Joseph Nutaro, Phoenix, AZ (US); Christine Marie Haissig, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/463,657

(22) Filed: May 3, 2012

(65) Prior Publication Data

US 2013/0297102 A1 Nov. 7, 2013

(51) Int. Cl.
*G05D 1/02* (2006.01)

(52) U.S. Cl.
USPC ..... 701/3; 701/23; 701/25; 701/26; 244/76 R

(58) Field of Classification Search
USPC .......................... 701/3, 23, 25, 26; 244/76 R
See application file for complete search history.

(56) References Cited

U.S. PATENT DOCUMENTS

| 3,706,969 | A | 12/1972 | Paredes |
| 3,807,664 | A | 4/1974 | Kelly, Jr. et al. |
| 4,659,039 | A | 4/1987 | Valdes |
| 5,078,340 | A | 1/1992 | Anderberg |
| 6,411,890 | B1 | 6/2002 | Zimmerman |
| 6,553,307 | B2 | 4/2003 | Stratton et al. |
| 6,571,166 | B1 | 5/2003 | Johnson et al. |
| 6,731,226 | B2 | 5/2004 | Walter |
| 6,751,545 | B2 | 6/2004 | Walter |
| 6,945,354 | B2 | 9/2005 | Goff |
| 7,222,017 | B2 | 5/2007 | Clark et al. |
| 7,226,018 | B2 | 6/2007 | Sullivan |
| 7,237,748 | B2 | 7/2007 | Sullivan |
| 7,382,284 | B1 | 6/2008 | Armstrong et al. |
| 7,445,178 | B2 | 11/2008 | McCoskey et al. |
| 7,564,372 | B1 | 7/2009 | Bailey et al. |
| 7,592,929 | B2 | 9/2009 | Pepitone |
| 7,594,626 | B2 | 9/2009 | Soderberg |
| 7,703,717 | B2 | 4/2010 | Soderberg |
| 7,731,122 | B2 | 6/2010 | Frank |
| 7,737,867 | B2 | 6/2010 | Arthur et al. |
| 7,813,845 | B2 | 10/2010 | Doose et al. |
| 7,817,065 | B2 | 10/2010 | Fetzmann et al. |
| 7,974,773 | B1 | 7/2011 | Krenz et al. |

(Continued)

FOREIGN PATENT DOCUMENTS

GB 2471213 A 12/2010
WO 2007027588 A1 3/2007

OTHER PUBLICATIONS

EP Search Report dated Feb. 28, 2013 for application No. EP 12 182 097.1.

(Continued)

*Primary Examiner* — Mary Cheung
*Assistant Examiner* — Brian P Sweeney
(74) *Attorney, Agent, or Firm* — Ingrassia Fisher & Lorenz, P.C.

(57) ABSTRACT

An auto-guidance and control method and system is provided for use in conjunction with an aircraft electric taxi system. Aircraft status data is obtained, and airport feature data accessed. A processor generates taxi path guidance and control information including at least taxi speed guidance information, and sends commands derived from the taxi speed guidance information by the processor directly to an electric taxi controller to regulate the taxi speed of the aircraft.

19 Claims, 8 Drawing Sheets

(56) References Cited

U.S. PATENT DOCUMENTS

| | | | |
|---|---|---|---|
| 7,975,959 B2 | 7/2011 | Perry et al. | |
| 7,975,960 B2 | 7/2011 | Cox et al. | |
| 7,983,804 B2 | 7/2011 | Cox et al. | |
| 8,024,078 B2 | 9/2011 | Coulmeau et al. | |
| 8,140,257 B2 | 3/2012 | Villaume et al. | |
| 8,403,259 B2* | 3/2013 | Charuel et al. | 244/103 S |
| 2003/0102987 A1* | 6/2003 | Walter | 340/972 |
| 2004/0059497 A1 | 3/2004 | Sankrithi | |
| 2006/0065779 A1* | 3/2006 | McCoskey et al. | 244/100 R |
| 2007/0158497 A1 | 7/2007 | Edelson et al. | |
| 2007/0282491 A1 | 12/2007 | Cox et al. | |
| 2008/0109163 A1* | 5/2008 | Stone et al. | 701/211 |
| 2008/0179146 A1 | 7/2008 | Sullivan | |
| 2008/0191903 A1 | 8/2008 | Doubourg et al. | |
| 2009/0045982 A1 | 2/2009 | Caillaud et al. | |
| 2009/0150008 A1 | 6/2009 | Villaume et al. | |
| 2009/0218440 A1 | 9/2009 | Dilmaghani et al. | |
| 2009/0261197 A1 | 10/2009 | Cox et al. | |
| 2010/0006699 A1 | 1/2010 | Sullivan | |
| 2010/0063716 A1 | 3/2010 | Brozat | |
| 2010/0114491 A1 | 5/2010 | Maily | |
| 2010/0114922 A1 | 5/2010 | Gayraud et al. | |
| 2010/0198489 A1 | 8/2010 | Rozovski et al. | |
| 2010/0204909 A1 | 8/2010 | Gayraud et al. | |
| 2011/0046868 A1 | 2/2011 | Michel et al. | |
| 2011/0133545 A1 | 6/2011 | Pearson et al. | |
| 2011/0198439 A1 | 8/2011 | Rotger et al. | |
| 2011/0233328 A1 | 9/2011 | Alleau et al. | |
| 2011/0290933 A1 | 12/2011 | Cros et al. | |
| 2011/0297786 A1 | 12/2011 | Sweet et al. | |
| 2011/0313597 A1 | 12/2011 | Wilson et al. | |
| 2011/0313645 A1 | 12/2011 | Shukla | |
| 2013/0057414 A1* | 3/2013 | Nutaro et al. | 340/958 |
| 2013/0131888 A1* | 5/2013 | Nutaro et al. | 701/1 |

OTHER PUBLICATIONS

EP Office Action dated Mar. 12, 2013 for application No. 12 182 097.1.

Distributed and redundant electro-mechanical nose wheel steering system, Dress Paris, DRESS early achievements presentation—Paris Air Show 2009.

Ropp Management, Automated NextGen Taxi System, Purdue University, 2010.

Delos Aerospace Developing Wheel Motor Landing Gear System for Aircraft, Delos, May 17, 2010.

Dignan; Honeywell, Safran eye green airplane taxiing, Honeywell-Safran, Jun. 19, 2011.

Learmount; Airliners to auto-taxi through fog, Messier-Bugatti and Messier-Dowty, Jul. 4, 2006.

Thomas; Airbus taxi trials, Airbus, Jul. 15, 2011.

Lufthansa technik, Joint demonstration of new electric taxi system, Aug. 12, 2011.

Cho et al.; Fully automatic taxiing, Takeoff and landing of a UAV only with a single-antenna GPS receiver, GNSS Lab, School of Mechanical & Aerospace Eng., Seoul Natl. Univer., May 2, 2007.

Farnborough; Messier-Bugatti plans demonstration of electric taxi concept, Messier-Bugatti, Jul. 19, 2010.

Kulcsar; Distributed and redundant electrmechanical nose wheel sterring system (DRESS), Budapest University, Jun. 5, 2006.

Kobayashi; Decrease in ground-run distance of airplanes by applying electrically driven wheels, Japan Aerospace Exploration Agency, Jun. 15, 2010.

Ramsey; Ricardo develops airplane taxi bot to reduce emissions, noise, Nov. 21, 2009.

Katz; Evaluation of a prototype advanced taxiway guidance system (ATGS), USDOT, Feb. 2000.

Nutaro, J. et al.: "Electric Taxi System Guidance" filed with the USPTO on Sep. 1, 2011 and assigned U.S. Appl. No. 13/223,461.

Nutaro, J. et al.: "High Integrity, Surface Guidance System for Aircraft Electric Taxi" filed with the USPTO on Oct. 18, 2012 and assigned U.S. Appl. No. 13/655,407.

Kim, J.Y., et al., ANTS—Automated NextGen Taxi System; Dec. 31, 2010; FAA Design Competition 2009-2010; URL: http://emerald.ts.odu.edu/Apps/FAAUDCA.nsf/Ropp%20Management.pdf?OpenFileResource, retrieved from the Internet on Jun. 26, 2013.

EP Search Report dated Aug. 21, 2013 for application No. 13 163 438.8.

EP Office Action dated Sep. 6, 2013 for application No. 13 163 438.8.

USPTO Office Action for U.S. Appl. No. 13/223,461 dated Oct. 2, 2013.

* cited by examiner

2

ELECTRIC TAXI AUTO-GUIDANCE AND CONTROL SYSTEM

TECHNICAL FIELD

Embodiments of the subject matter described herein relate generally to avionics systems such as electric taxi systems. More particularly, embodiments of the subject matter relate to an automatic guidance and control system for an aircraft electric taxi system.

BACKGROUND

Traditional aircraft taxi systems utilize the primary thrust engines (running at idle) and the braking system of the aircraft to regulate the speed of the aircraft during taxi. Such use of the primary thrust engines, however, is inefficient and wastes fuel. For this reason, electric taxi systems (i.e., traction drive systems that employ electric motors) have been developed for use with aircraft. Electric taxi systems are more efficient than traditional engine-based taxi systems because they can be powered by an auxiliary power unit (APU) of the aircraft rather than the primary thrust engines.

In its simplest form, a crew member may manually steer the aircraft during an electric taxi maneuver using a flight deck controller (e.g. a tiller) while looking out a window. In this case, the crew member utilizes their best judgment regarding execution of their taxi maneuver. An improvement over this process is provided by a visual guidance system wherein a crew member enters airport parameters such as airport congestion, the visual guidance system determines the best taxi path, subject to ATC clearance, and presents it on a cockpit display along with instructions as to the best way to navigate the aircraft along the suggested taxi path; e.g. speed, steering, when to thrust engines off and turn electric drive motors on, etc. ATC clearance can include taxi route, assigned take-off or landing runway, hold points etc and is considered in the calculated path.

While effective, the above described visual guidance system exhibits certain inefficiencies. For example, variations in complying with display guidance instructions, even in the neighborhood of a few seconds, may decrease fuel savings; e.g. a pilot waits a short time before turning thrust engines off. The pilot may execute faster turns than necessary resulting in increased tire wear, or brake more often than necessary causing unnecessary wear and tear on the braking system. In addition, some actions that would increase efficiency are too subtle for the crew to recognize and manage; e.g. optimum acceleration of the aircraft during taxi.

Accordingly, it would be desirable to provide an electric taxi automatic guidance and control system, capable of guiding and controlling an aircraft during a taxi maneuver with minimal crew intervention thus increasing efficiency and reducing the work load of the crew.

BRIEF SUMMARY

In accordance with the foregoing, there is provided an auto-guidance and control method for use in conjunction with an aircraft electric taxi system, comprising obtaining aircraft status data, accessing airport feature data, generating with a processor a taxi path guidance and control information including at least taxi speed guidance information, and sending commands derived from the taxi speed guidance information by the processor directly to an electric taxi controller to regulate the taxi speed of the aircraft.

There is also provided a guidance and control system for use on-board an aircraft equipped with an electric taxi mechanism. The system comprises a first source of aircraft status data, a second source of airport feature data, and an electric taxi controller. A processor is coupled to the first and second sources and to the electric taxi controller and is configured to generate taxi path guidance and control information including at least taxi speed guidance information, and send commands derived from the taxi speed guidance information directly to the electric taxi controller.

An auto-guidance and control method for use in conjunction with an aircraft electric taxi system is also provided. Electric taxi guidance may be performed in a manual mode by a crew or in an auto-mode by an auto-guidance and control system. The method comprises obtaining aircraft status data, accessing airport feature data, and generating in a processor, in response to at least the aircraft status data and the airport feature data, taxi guidance information. The method also comprises rendering the taxi guidance information on a display, manually navigating a guidance route utilizing guidance information on the display in the manual mode, and applying taxi-path commands generated by the processor directly to taxi path guidance controllers in the auto-mode.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the following detailed description and claims when considered in conjunction with the accompanying figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle that may be subjected to taxi operations, such as aircraft, ships, etc. The exemplary embodiment described herein assumes that an aircraft includes an electric taxi system, which utilizes one or more electric motors as a traction system to drive the wheels of the aircraft during taxi operations. The system and methods presented here provide guidance information to the flight crew for purposes of optimizing or otherwise enhancing the operation of the electric taxi system. Such optimization may be based on one or more factors such as, without limitation: fuel conservation; prolonging the useful life of the brake system; avoiding ground vehicles or other aircraft; and reducing taxi time. In certain embodiments, the taxi guidance information is rendered with a dynamic synthetic display of the airport field to provide visual guidance to the flight crew. The taxi guidance information may include a desired taxi route or path, a target speed for the electric taxi system to maintain, a graphical indicator or message that identifies the best time to turn the primary thrust engine(s) on or off, best time to turn on or shut off the auxiliary power unit (APU) or the like. The display system may be implemented as an onboard flight deck system, as a portable computer, as an electronic flight bag, or any combination thereof.

Figure 1:
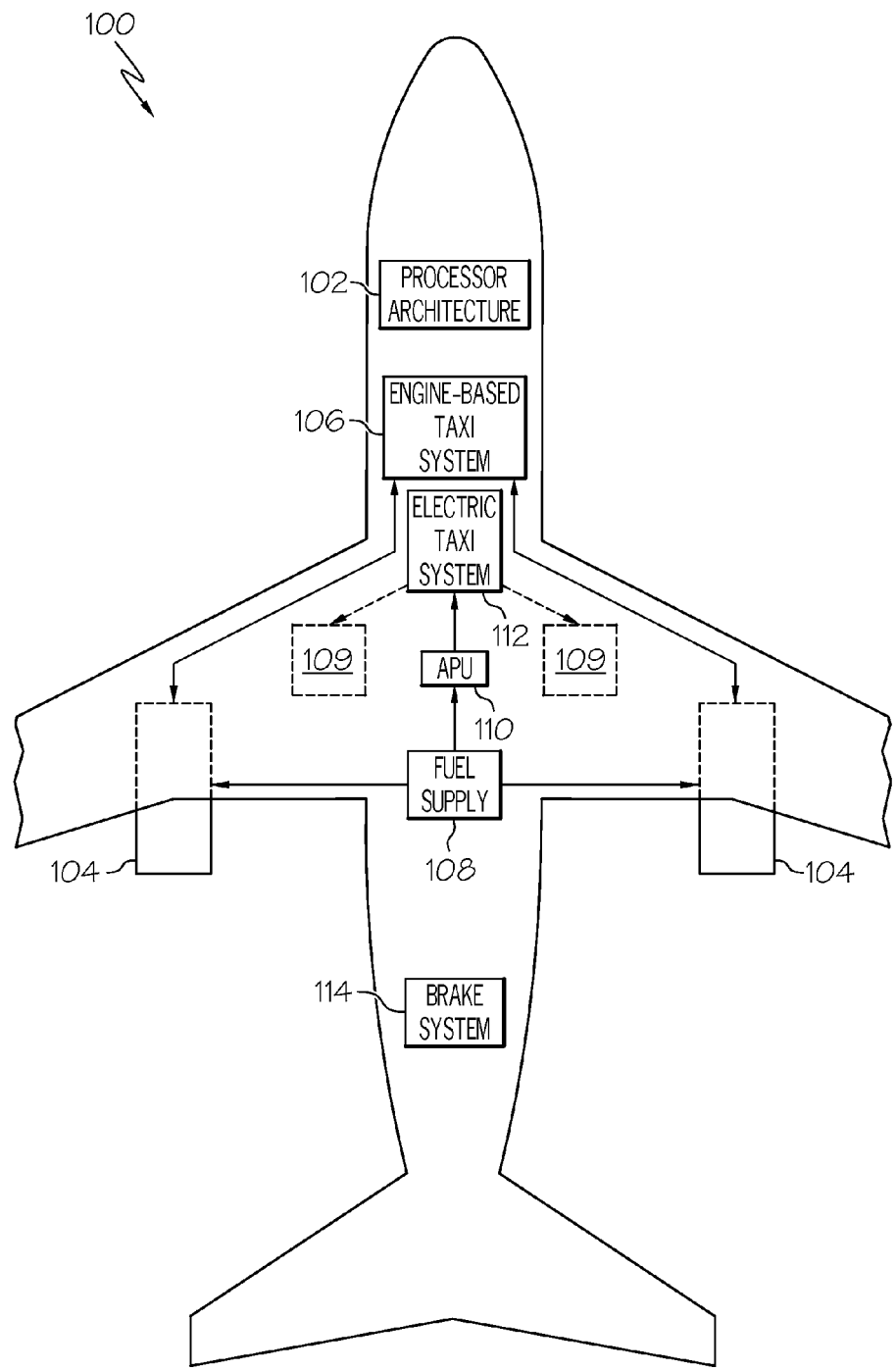
FIG. 1 is a simplified schematic representation of an aircraft having an electric taxi system.

FIG. 1 is a simplified schematic representation of an aircraft 100. For the sake of clarity and brevity, FIG. 1 does not depict the vast number of systems and subsystems that would appear onboard a practical implementation of the aircraft 100. Instead, FIG. 1 merely depicts some of the notable functional elements and components of the aircraft 100 that support the various features, functions, and operations described in more detail below. In this regard, the aircraft 100 may include, without limitation: a processor architecture 102; one or more primary thrust engines 104; an engine-based taxi system 106; a fuel supply 108; wheel assemblies 109; an auxiliary power unit (APU) 110; an electric taxi system 112; and a brake system 114. These elements, components, and systems may be coupled together as needed to support their cooperative functionality.

The processor architecture 102 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor architecture 102 is configured to support various electric taxi guidance processes, operations, and display functions.

In practice, the processor architecture 102 may be realized as an onboard component of the aircraft 100 (e.g., a flight deck control system, a flight management system, or the like), or it may be realized in a portable computing device that is carried onboard the aircraft 100. For example, the processor architecture 102 could be realized as the central processing unit (CPU) of a laptop computer, a tablet computer, or a handheld device. As another example, the processor architecture 102 could be implemented as the CPU of an electronic flight bag carried by a member of the flight crew or mounted permanently in the aircraft. Electronic flight bags and their operation are explained in documentation available from the United States Federal Aviation Administration (FAA), such as FAA document AC 120-76B.

The processor architecture 102 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 102 such that the processor architecture 102 can read information from, and write information to, the memory. In the alternative, the memory may be integral to the processor architecture 102. In practice, a functional or logical module/component of the system described here might be realized using program code that is maintained in the memory. Moreover, the memory can be used to store data utilized to support the operation of the system, as will become apparent from the following description.

The illustrated embodiment of the aircraft includes at least two primary thrust engines 104, which may be fed by the fuel supply 108. The engines 104 serve as the primary sources of thrust during flight. The engines 104 may also function to provide a relatively low amount of thrust (e.g., at idle) to support a conventional engine-based taxi system 106. When running at idle, the engines 104 typically provide a fixed amount of thrust to propel the aircraft 100 for taxi maneuvers. When the engines 104 are utilized for taxi operations, the speed of the aircraft is regulated by the brake system 114.

Exemplary embodiments of the aircraft 100 also include the electric taxi system 112 (which may be in addition to or in lieu of the engine-based taxi system 106 which typically provides a pilot with manual control of the aircraft). In certain implementations, the electric taxi system 112 includes at least one electric motor (not shown in FIG. 1) that serves as the traction system for the drive wheel assemblies 109 of the aircraft 100. The electric motor may be powered by the APU 110 onboard the aircraft 100, which in turn is fed by the fuel supply 108. As described in more detail below, the electric taxi system 112 can be controlled by a member of the flight crew to achieve a desired taxi speed. Unlike the traditional engine-based taxi system 106, the electric taxi system 112 can be controlled to regulate the speed of the drive wheels without requiring constant or frequent actuation of the brake system 114. The aircraft 100 may employ any suitably configured electric taxi system 112, which employs electric motors to power the wheels of the aircraft during taxi operations.

Figure 2:
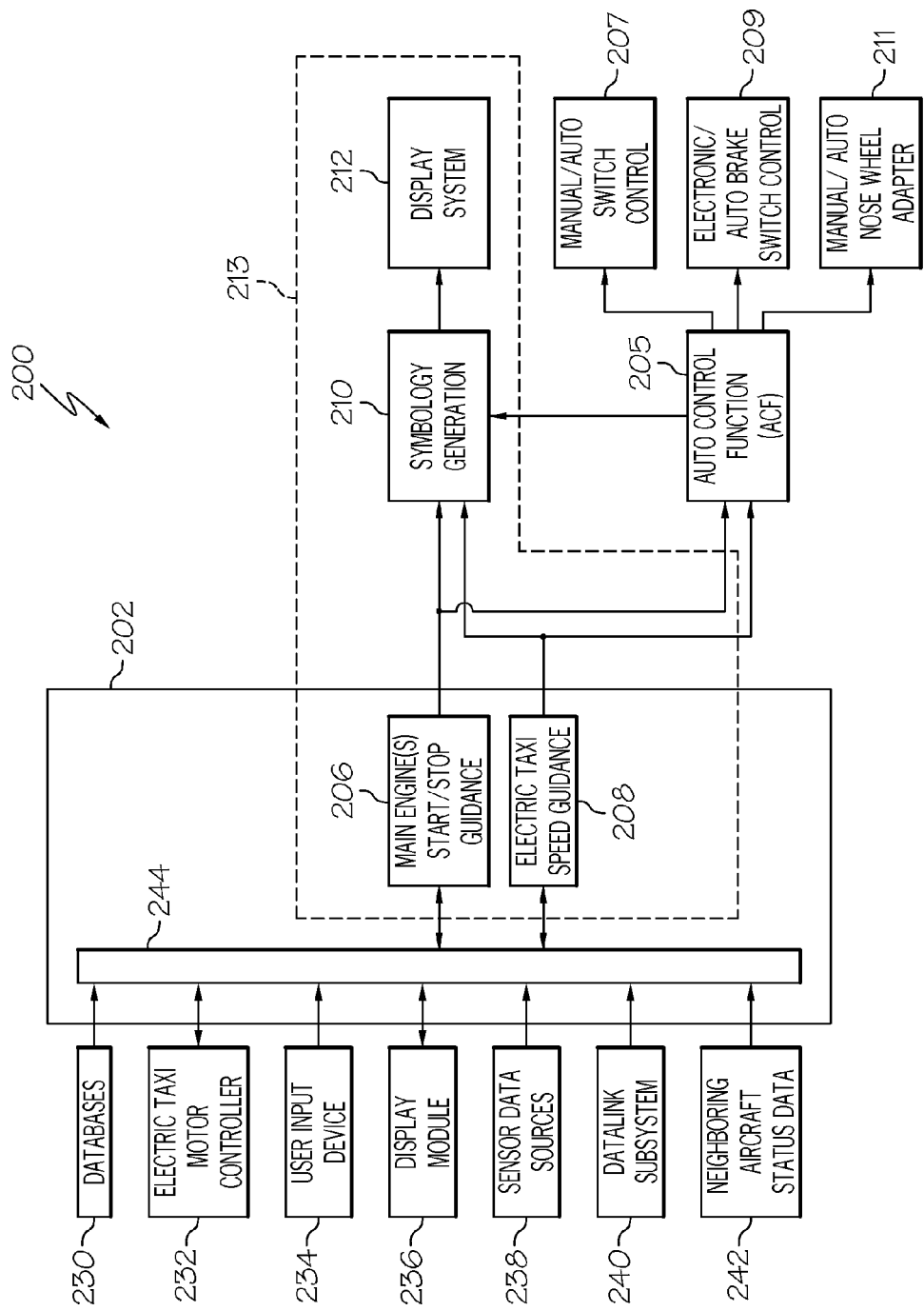
FIG. 2 is a general block diagram of an exemplary embodiment of an automatic electric taxi guidance system suitable for use on an aircraft.

FIG. 2 is a schematic representation of an exemplary embodiment of an automatic guidance (auto-guidance) and control system 200 suitable for use in conjunction with the aircraft 100. Depending upon the particular embodiment, the taxi auto-guidance system 200 may be realized in conjunction with a ground management system 202, which in turn may be implemented in a line replaceable unit (LRU) for the aircraft 100, in an onboard subsystem such as the flight deck display system, in an electronic flight bag, in an integrated modular avionics (IMA) system, or the like. The illustrated embodiment of the taxi auto-guidance system 200 generally includes, without limitation: an engine start/stop guidance module 206; an electric taxi speed guidance module 208; a symbology generation module 210; a display system 212; an auto control function (ACF) 205; manual/auto switch control 207; electric/auto brake switch control 209; and manual/auto nose wheel adaptor 211. The taxi guidance system 200 may also include or cooperate with one or more of the following elements, systems, components, or modules: databases 230; a controller 232 for the electric taxi system motor; at least one user input device 234; a display module 236; sensor data sources 238; a data link subsystem 240; and a source of neighboring aircraft location and status data 242 including collision sensors. In practice, various functional or logical modules of the taxi guidance system 200 may be implemented with the processor architecture 102 (and associated memory) described above with reference to FIG. 1. The taxi guidance system 200 may employ any appropriate communication architecture 244 or arrangement that facilitates interfunction data communication, transmission of control and command signals, provision of operating power, transmission of sensor signals, etc.

The taxi guidance system 200 is suitably configured such that the engine start/stop guidance module 206 and/or the electric taxi speed guidance module 208 are responsive to or are otherwise influenced by a variety of inputs, and together with symbology generation 210 and display system 212 comprise a visual electric taxi guidance system 213 (delineated with a dashed line). For this particular embodiment, the influencing inputs are obtained from one or more of the sources and components listed above (i.e., the items depicted at the left side of FIG. 2). The outputs of the engine start/stop guidance module 206 and/or the electric taxi speed guidance module 208 are provided to the symbology generation module 210, which generates corresponding graphical representations suitable for rendering with a synthetic display of an airport field. The symbology generation module 210 cooperates with the display system 212 to present taxi guidance information to the user.

The databases 230 represent sources of data and information that may be used to generate taxi guidance information. For example the databases 230 may store any of the following, without limitation: airport location data; airport feature data, which may include layout data, coordinate data, data related to the location and orientation of gates, runways, taxiways, etc.; airport restriction or limitation data; aircraft configuration data; aircraft model information; engine cool down parameters, such as cool down time period; engine warm up parameters, such as warm up time period; electric taxi system specifications; and the like. In certain embodiments, the databases 230 store airport feature data that is associated with (or can be used to generate) synthetic graphical representations of a departure or destination airport field. The databases 230 may be updated as needed to reflect the specific aircraft, the current flight plan, the departing and destination airports, and the like.

The controller 232 represents the control logic and hardware for the electric taxi motor. In this regard, the controller 232 may, in fact, comprise multiple controllers and/or include one or more user interface elements that enable the pilot to activate, deactivate, and regulate the operation of the electric taxi system as needed. The controller 232 may also be configured to provide information related to the status of the electric taxi system, such as operating condition, wheel speed, motor speed, and the like.

The user input device 234 may be realized as a user interface that receives input from a user (e.g., a pilot) and, in response to the user input, supplies appropriate command signals to the taxi guidance system 200. The user interface may be any one, or any combination, of various known user interface devices or technologies, including, but not limited to: a cursor control device such as a mouse, a trackball, or joystick; a keyboard; buttons; switches; or knobs, or even voice and gesture commands. Moreover, the user interface may cooperate with the display system 212 to provide a touch screen interface. The user input device 234 may be utilized to acquire various user-selected or user-entered data, which in turn influences the electric taxi guidance information generated by the taxi guidance system 200. For example, the user input device 234 could obtain any of the following, without limitation: a selected gate or terminal at an airport; a selected runway; user-entered taxiway directions; user-entered airport traffic conditions; user-entered weather conditions; runway attributes; and user options or preferences.

The display module 236 may include a software application and/or processing logic to generate dynamic synthetic displays of airport fields during taxi operations. The display module 236 may also be configured to generate dynamic synthetic displays of a cockpit view during flight. In practice, the display module 236 cooperates with the symbology generation module 210 and the display system 212 to render graphical indicia of electric taxi guidance information, as described in more detail below.

The sensor data sources 238 represents various sensor elements, detectors, diagnostic components, and their associated subsystems onboard the aircraft. In this regard, the sensor data source 238 functions as sources of aircraft status data for the host aircraft. In practice, the taxi guidance system 200 could consider any type or amount of aircraft status data including, without limitation, data indicative of: tire pressure; nose wheel angle; brake temperature; brake system status; outside temperature; ground temperature; engine thrust status; primary engine on/off status; aircraft ground speed; geographic position of the aircraft; wheel speed; electric taxi motor speed; electric taxi motor on/off status; or the like.

The data link subsystem 240 is utilized to provide air traffic control data to the host aircraft, preferably in compliance with known standards and specifications. Using the data link subsystem 240, the taxi guidance system 200 can receive air traffic control data from ground based air traffic controller stations and equipment. In turn, the system 200 can utilize such air traffic control data as needed. For example, the taxi clearance, assigned takeoff runway and other airport navigation instructions may be provided by an air traffic controller using the data link subsystem 240.

In an exemplary embodiment, the host aircraft supports data communication with one or more remote systems. More specifically, the host aircraft receives status data for neighboring aircraft using, for example, an aircraft-to-aircraft data communication module (i.e., the source of neighboring aircraft status data 242) or an on-board collision avoidance sensor. For example, the source of neighboring aircraft status data 242 may be configured for compatibility with Automatic Dependent Surveillance-Broadcast (ADS-B) technology, with active Mode S interrogation technology, and/or with similar technologies.

The engine start/stop guidance module 206 and the electric taxi speed guidance module 208 are suitably configured to respond in a dynamic manner to provide real-time guidance for optimized operation of the electric taxi system. In practice, the taxi guidance information (e.g., taxi path guidance information, start/stop guidance information for the engines, and speed guidance information for the electric taxi system) might be generated in accordance with a fuel conservation specification or guideline for the aircraft, in accordance with an operating life longevity specification or guideline for the brake system 114 (see FIG. 1), and/or in accordance with other optimization factors or parameters. To this end, the system processes relevant input data and, in response thereto, generates taxi path guidance information related to a desired taxi route to follow. The desired taxi route can then be presented to the flight crew in an appropriate manner. It should be noted that as used herein, the word "route" means the various directions an aircraft takes to reach a target location. The word "path" comprises the "route" and the variations in acceleration, velocity, and braking along the route. Thus, route may be shown in a single map and path is the route including speed, acceleration, and breaking commands along the route.

The engine start/stop guidance module 206 processes relevant input data and, in response thereto, generates start/stop guidance information that is associated with operation of the primary thrust engine(s) and/or is associated with operation of the electric taxi system.

As explained in more detail below, the start/stop guidance information may be presented to the user in the form of displayed markers or indicators in a synthetic graphical representation of the airport field. The electric taxi speed guidance module 208 processes relevant input data and, in response thereto, generates speed guidance information for the onboard electric taxi system. The speed guidance information may be presented to the user as a dynamic alphanumeric field displayed in the synthetic representation of the airport field.

The symbology generation module 210 can be suitably configured to receive the outputs of the engine start/stop guidance module 206 and the electric taxi speed guidance module 208, and process the received information in an appropriate manner for incorporation, blending, and integration with the dynamic synthetic representation of the airport field. Thus, the electric taxi guidance information can be merged into the display to provide enhanced situational awareness and taxi instructions to the pilot in real-time.

The display system 212 includes at least one display element that cooperates with a suitably configured graphics system (not shown), which may include symbology generation module 210 as a component thereof. This allows the display system 212 to display, render, or otherwise convey one or more graphical representations, synthetic displays, graphical icons, visual symbology, or images associated with operation of the host aircraft on the display element, as described in greater detail below. In practice, the display element receives image rendering display commands from the display system 212 and, in response to those commands, renders a dynamic synthetic representation of the airport field during taxi operations.

The display element may be realized as an electronic display configured to graphically display flight information or other data associated with operation of the host aircraft under control of the display system 212. The display system 212 is usually located within a cockpit of the host aircraft. Alternatively (or additionally), the display system 212 could be realized in a portable computer, and electronic flight bag, or the like.

Referring still to FIG. 2, the outputs of the engine start/stop guidance module 206 and the electric taxi speed guidance module 208 are applied to inputs of auto control function (ACF) 205, which controls the processes, procedures, and sub-functions associated with electric taxi auto-guidance and control. As can be seen, outputs of ACF 205 provide control and command signals to manual/auto switch control 207, electric/auto brake switch control 209, and manual/auto hose wheel adapter 211, described in more detail hereinafter in connection with FIGS. 3-8. For now, it should be appreciated that ACF 205 is primarily responsible for auto-guidance and control while visual guidance function 213 may be monitored and available as a backup should a failure in the operation of the auto guidance and control function occur.

Figure 3:
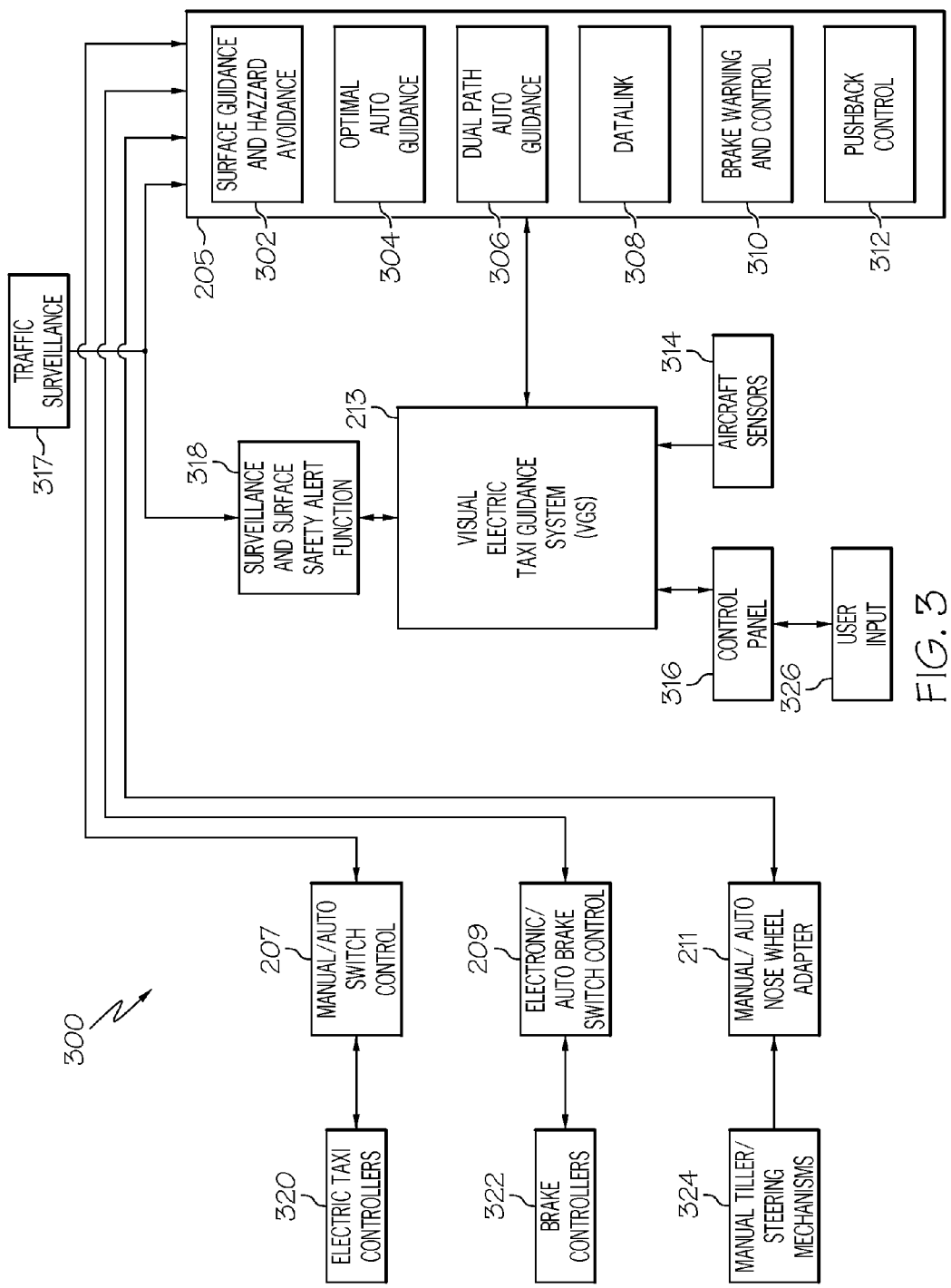
FIG. 3 is a more detailed block diagram of a further exemplary embodiment of an automatic electric taxi guidance system suitable for use on an aircraft.

FIG. 3. Is a schematic representation of an exemplary embodiment of an auto guidance and control system 300 suitable for use with aircraft 200 wherein like elements are denoted with like reference numerals. As can be seen, ACF 205 includes a number of sub-functions; i.e. surface guidance and hazard avoidance sub-function 302; optimal auto guidance sub-function 304; dual-path auto guidance sub-function 306; data link sub-function 308; brake warning and control sub-function 310, and pushback control sub-function 312. Each of these may reside in one or more processors as described above, e.g. processor 102.

Surface guidance and hazard avoidance sub-function 302 is capable of automatically providing surface guidance and smart hazard avoidance to aircraft 100, and is capable of alerting the flight crew should such a hazard arise. To do this, surface guidance and hazard avoidance sub-function considers surveillance information from traffic including surrounding aircraft and ground vehicles 317. This information may be provided and/or include (1) transponders on traffic equipped with Automatic Dependence Surveillance Broadcast (ADS-B), Traffic Information Service Broadcast (TIS-B), or other sources such as on-board sensors; (2) own aircraft information and on-board sensors (e.g. radar or ultrasonic sensors on wing-tips); and (3) airport taxiway and runway databases including the cleared taxi route and assigned runway. The guidance function and overall safety on the airport surface will be improved by receiving halt information such as (1) taxi route and assigned runway information for other aircraft received from the other aircraft or from Air Traffic Control (ATC); (2) planned speed and acceleration of other aircraft equipped with electric taxi control and guidance systems and data linked from the other aircraft; and (3) external signal lights for indicating intended actions to traveling aircraft including flashing lights and/or lights of different colors. Hazard alerts may be provided if an aircraft is in a potential hazardous situation. Such alerts may be formulated within the auto-guidance and control system and/or in other aircraft systems. Such alerts may include advisory, cautionary, and/or audible and visual alerts relating to, (1) potential collisions with other aircrafts or ground vehicles; (2) crossing or entering a runway occupied by another aircraft or ground vehicle; (3) aircraft deviation from an assigned taxi route; and (4) receipt or acceptance by the aircraft of a taxi clearance that includes taxiways and runways that are not appropriate for the aircraft, e.g. aircraft too heavy or too wide.

Alerts may be auditory, visual, directive or non-directive and the response may be manual or automated. For example, an alert to warn of an impending collision may cause the system to automatically generate a hold if the crew does not take appropriate action such as moving the tiller, applying the brake, or manually pressing the hold button (each described below), within an appropriate time.

Surface guidance and hazard avoidance sub-function may also utilize position information of other aircraft to change the taxi path when other aircraft, vehicles, or objects block the natural or assigned route. In some cases, permission from the tower may be required to deviate from the assigned path. If there are two entrances to a runway, and a first aircraft is already waiting at one, the auto-guidance and control system of a second aircraft may detect that an assigned entrance is blocked and determined a new path to the other entrance. Visual electric taxi guidance system (VGS) 213 will display the new path option and produce an alert to the crew who can accept or reject the new path. It the new path is rejected and the second aircraft continues along the existing path, the crew may cause a hold or take manual control at the appropriate time. As usual in such situation the crew would contact the tower for instructions. If several aircrafts are in line for access to a runway for takeoff, the auto-guidance and control system can monitor the position of the aircraft in front and then start, stop, and adjust the speed as necessary to proceed in line.

Optimal auto guidance sub-function 304 determines the optimum path under based on minimizing APU fuel, brake wear, tire wear, and electric drive wear. It may also take into account the need for timeliness; e.g. proper gate time arrival and takeoff time. The crew may be able to choose among options such as (1) minimal cost; e/g/ fuel, tire wear, etc., (2) timeliness; e.g. gate and runway time, and (3) minimum time. Optimum auto-guidance sub-function may utilize aircraft-specific parameters stored in the aircraft databases to make optimal path determinations. In addition, the crew may enter additional information such as runway condition if not already stored in the VGS.

If desired, electric taxi operation may be commenced while simultaneously utilizing a thrust engine if permitted by the aircraft; e.g. APU assist to engine-start. This permits the crew to start the thrust engines without coming to a complete stop. After the thrust engine start and predetermined parameters (e.g. speed) are reached, both the electric taxi auto-guidance and control system and the electric taxi drive disengage. In a similar fashion, proper timing is determined for shutting the thrust engines off after landing to allow for proper cooling. Some operational situations may extend this phase to the use of one thrust engine with the electric taxi engaged for a period of time.

The automatic electric taxi guidance and control path may differ from the manual path guidance generated by visual electric taxi guidance system 213; e.g. the path guidance generated by the VGS. That is, the VGS may determine and display the target speed, but the auto guidance will determine optimum acceleration, which would be difficult to accomplish under manual control. The display system 212 (FIG. 2) will graphically show the optimum auto-guidance path (auto-path) when auto-guidance is engaged. When auto-guidance is not engaged, display system 212 will show the manual guidance path. For example, the auto path display may provide an indication of how well the aircraft is achieving the optimum acceleration.

Dual path auto guidance sub-function 306 coordinates the two paths, auto and manual. When auto engaged, the dual path function ensures that the display information relevant to auto control is displayed and the proper commands issued to the rest of the system. If auto mode is not engaged, the dual path function ensures that the display reflects manual guidance instructions and that commands are not sent to other systems. Data link sub-function 308 enables the tower to command the aircraft to halt or to provide the aircraft with an alternate plan. The pilot may except or reject the plan, typically after consultation with the tower.

Brake warning and control sub-function 310 can operate in two modes; i.e. a manual mode and an automatic mode. In the manual mode, aircraft may be slowed or stopped by shutting off the electric drive motors and allowing the aircraft to coast to a reduced speed or stop. Additionally, the electric drive motors themselves may be used as an aid in braking if regenerative braking is also employed to help reduce the aircraft speed. If additional braking is required, a warning is displayed on the VGS instructing the crew to apply braking. In the automatic mode, the brakes are applied automatically.

In most cases, push-back from the gate is accomplished using tugs while ground personnel monitor the maneuver. However, the ACF may be equipped with a pushback control sub-function 312 which may cooperate with other equipment such as rear facing cameras and a proximity detection system using, for example, ultrasonic sensors 314. The electric guidance and control system may determine the pushback path and generate a hold, if necessary. Pushback control sub-function 312 limits speed and control braking.

As stated previously, VGS 213 is coupled to AFC 205. Also coupled to VGS are the various aircraft sensors; e.g. tire pressure sensors, brake temperature sensors, pushback sensors, etc.; one or more control panels 316 and user input devices 326 (discussed in more detail in conjunction with FIGS. 4 and 5), and a surveillance and surface safety alert function 318. The surveillance and surface alert function 318 performs traffic and other hazard avoidance not specific to whether there is an electric taxi system onboard. This function receives traffic surveillance data from traffic surveillance 317, and the alerts from this system may be fed to surface guidance and hazard avoidance function 302. Surveillance and surface safety alert function 318 also receives ADS-B In data and collision avoidance data, both of which can also be provided to surface guidance and hazard alert sub-function 302. Surface guidance and hazard alert sub-function 302 then determines the appropriate action, if any, for the electric taxi system: e.g. brake, slow down, etc.

The surveillance and surface safety alert function is represents an existing system on the aircraft that performs traffic and other hazard avoidance that isn't specific to whether or not there is an electric taxi system on board. The alerts from this system can be fed into the surface guidance and hazard avoidance sub-function 302. The surveillance and surface safety alert function 318 also receives ADS-B In data and collision avoidance data from sensors, both of which can also be fed into the surface guidance and hazard avoidance sub-function which then determines what to do (e.g., brake, slow down, wait to perform some action, or do nothing).

A control panel 316 is shown in FIG. 3 and enables a crew member to interface with VGS 316 and therefore the entire auto-guidance and control system. Control panel 316 may be separate or may be integrated with other control panels. It may also be coupled to a user input device 326 such as a keyboard, cursor control, touch screen or other input device.

Manual/auto switch controller 207 is coupled to the electric taxi controllers 320 and selectively applies either the manual controls or the automatic controls to the left and right taxi controllers to adjust speed. Electric/auto brake switch controller 209 is coupled to the brake controllers 322 and selectively permits either the auto-guidance and control system or the normal aircraft braking commands to control the aircraft brakes. Manual/auto nose wheel adapter 211 is coupled to manual tiller 324. In some aircraft, adapter 211 contains the servo-mechanisms that control the hydraulics which, in turn, control the nose wheel. In other aircraft, the hydraulics are replaced with electronics. In any event, the manual/auto nose wheel adapter causes the auto-guidance to be disengaged when tiller 324 is moved.

Figure 4:
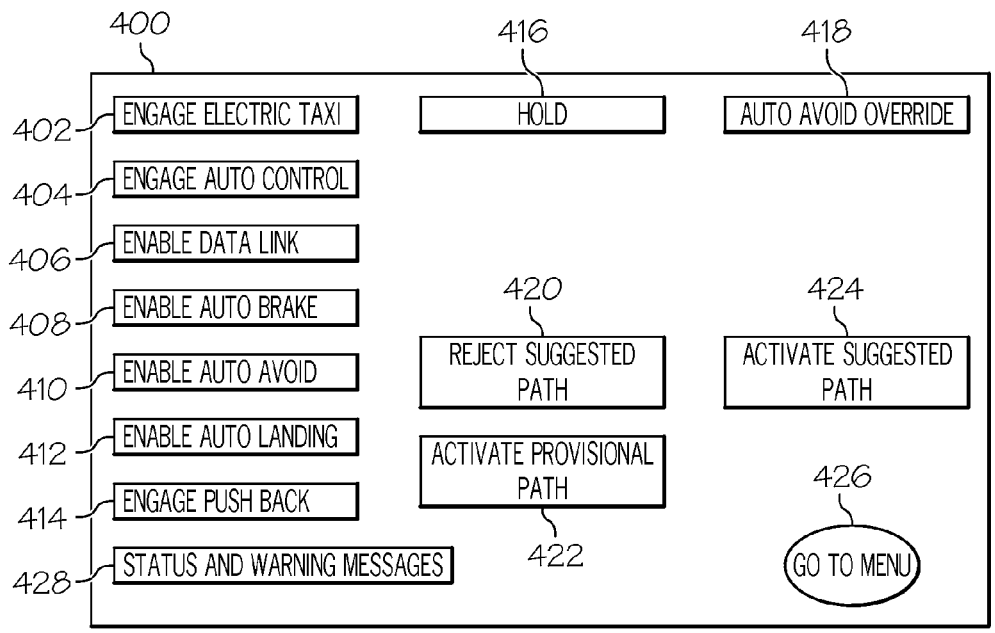
FIG. 4 illustrates a first user input device in the form of a touchscreen for use with the embodiment shown in FIG. 3.
Figure 5:
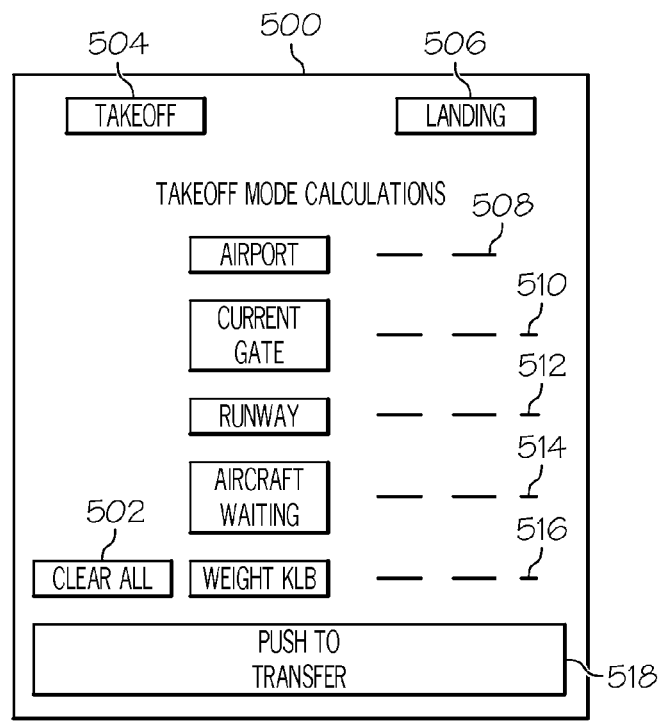
FIG. 5 illustrates a second user input device in the form of a touchscreen for use with the embodiment shown in FIG. 3.

FIGS. 4 and 5 illustrate, user input devices, 400 and 500 respectively, suitable for communicating with VGS 213. Referring to FIG. 4, control 402 (Engage Electric Taxi) engages and disengages the electric taxi drive, and control 404 (Engage Auto Control) engages the auto-guidance and control function rather than simply displaying a possible airport route.

FIG. 4 is shown and described as, for example, touchscreen. A first activation of Hold control 416 halts the aircraft but does not remove the aircraft from automatic guidance mode. A second activation of Hold control will allow the aircraft to resume travel under auto guidance. A crew member may initiate a hold, for example (1), upon receiving a hold instruction from the tower; (2) while awaiting a clearance such as clearance to cross a runway; or (3) upon seeing an obstacle such as a crossing truck. A halt may be generated and Hold 416 illuminated if an on-board sensor detects an obstacle. If data link 308 (FIG. 3) is enabled, a halt may be generated by a command from the tower. A crew member may initiate a hold, or a hold may be generated, when Engage Pushback Control 414 is actuated and an aircraft is leaving the gate without using a tug.

It is contemplated that two path determinations may be made; (1) provisional, and (2) active. After the crew enters initial path data and engages auto guidance and control, the path becomes active. However, the crew may need to modify the path during taxi (e.g. a new gate is assigned). The crew enters this provisional data and engages by activating the Activate Provisional Plan control 422. The new path is sent to the auto guidance and control system.

When the system detects an imminent collision, the auto-guidance and control system commands a halt, and control 418 (Auto Avoid Override) is illuminated. Activating control 418 overrides the halt.

At times, the electric guidance and control system will generate a new suggested path and present it on display system 212 (FIG. 2). The crew may accept the suggested plan (Activate Suggested Plan 424) or reject the suggested plan (Reject Suggested Plan 420). If accepted, the suggested plan becomes active. If rejected, the suggested plan is erased.

If Data link is enabled (control 406), the ATC clearance or other ATC instructions can be input directly into the system. For example, a hold command could be sent or taxi clearance could be provided by the tower. If a new taxi clearance is sent, display system 212 displays a new suggested path. This new suggested path may be accepted or rejected via controls 424 and 420, respectively as previously described.

If control 408 (Enable Auto Brake) is enabled, the electric auto guidance and control system will automatically apply brakes as needed. Otherwise, the crew will respond to warnings on the display. Control 410 (Enable Auto Avoid) enables the auto guidance and control function to engage automatically upon landing. Enabling Auto Avoid (410) allows all the obstacle avoidance functions such as the surface hazard or collision detection functions to generate a halt automatically. If this is not enabled then the crew depends solely upon their own observations to halt the aircraft.

Region 428 is reserved for status and warning messages generated through data link 308 or by the auto-guidance and control system. A "Go to Menu" control 426 is also provided for this touch screen display to allow the crew to display other system functions because the main touch panel is utilized for both auto-guidance and manual visual guidance (as well as other system functions; e.g. lighting, landing gear, etc.) When auto-guidance is selected, the touch panel appears as it does in FIG. 4.

For convenience, buttons may change from a first color to a second color (e.g. grey to green) when engaged or enabled by pushing and display a legend such as "Engaged" or "Enabled". Hold 416 may be displayed in a first color (e.g. blue) when activated by the crew and in a second color (e.g. green) when activated by the auto-guidance and control system. Auto Avoid Override 418 may blink (e.g. three times in blue) when activated. If a suggested or provisional plan is shown on display 212, controls 420 and 424 may be displayed in a first color (e.g. blue) and then revert to a second color (e.g. grey) when a decision is made. The engage/enable controls (402-414) may also be controlled by their respective related functions. For example, auto-brake (Enable Auto Brake 408) will be displayed and revert to grey if there is a failure in braking.

FIG. 5 illustrate a data entry screen 500, for entering taxi parameters, that may be separate or integrated with the control panel shown in FIG. 4. A crew member may clear previously entered data (Clear All 502), and select Takeoff (504) or Landing (506). The pilot may then enter airport data (508), gate information (510) runway information (512), number of aircraft waiting (514) and aircraft weight (516). When satisfied, the pilot may enter this data by activating Push to Transfer (518).

Figure 6:
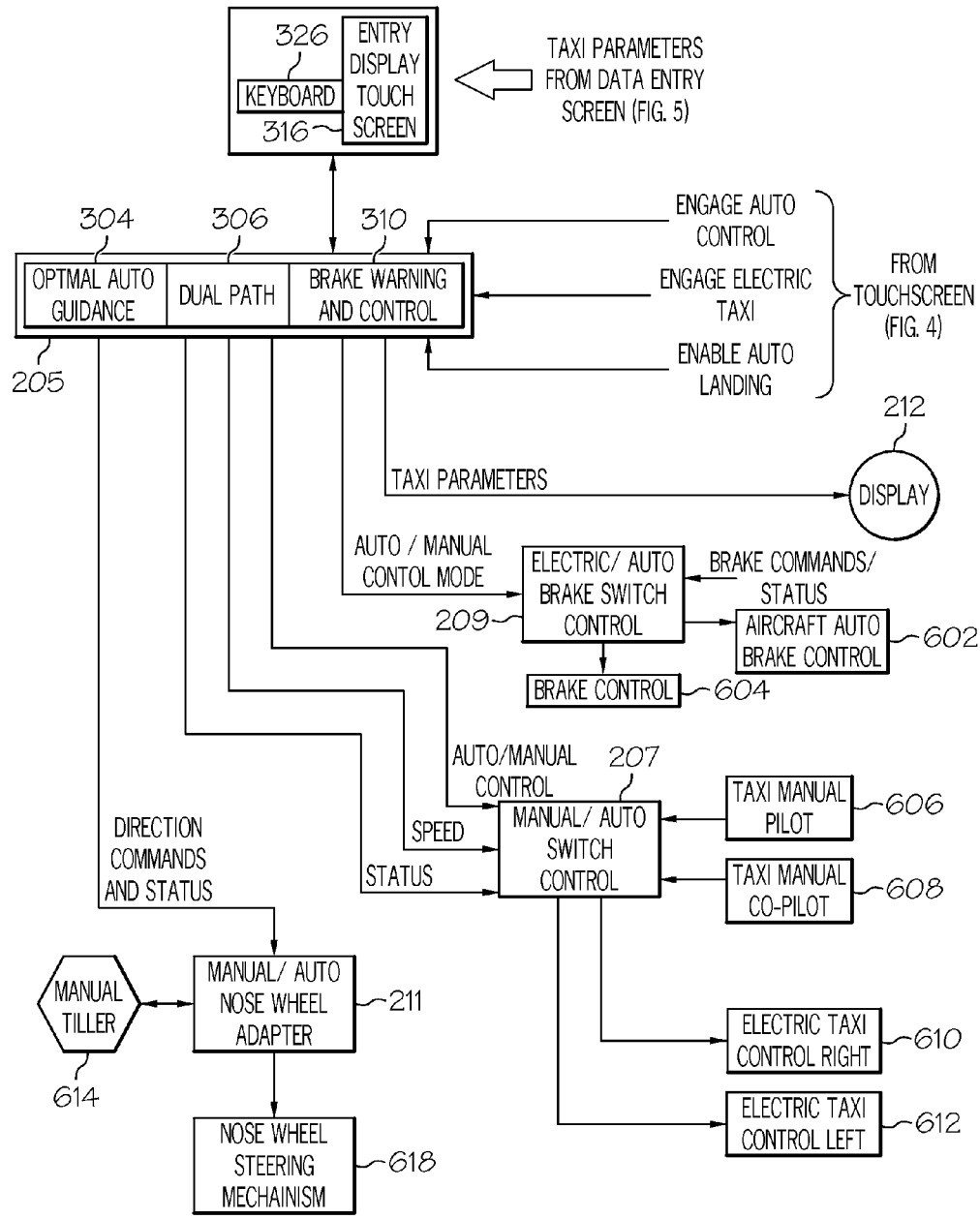
FIG. 6 is a detailed block diagram of a still further exemplary embodiment of an automatic electric taxi guidance system suitable for use on an aircraft.

FIG. 6 is a block diagram illustrating the operation of the electric taxi auto-guidance and control system in accordance with an embodiment for a typical operation prior to landing and on the ground thereafter. Activating Engage Auto Control (404 in FIG. 4) causes AFC 205 to display the data entry page (FIG. 5) on VGS display system 212 (FIG. 2). The crew then enters the appropriate parameters and activates the transfer button 518 (FIG. 5) causing the data to be transferred to the ACF 205 wherein an auto-guidance path is determined and passed on to other functions via dual path function 306. The path/route is also passed on to the VGS, and the auto guidance is displayed on the flight deck; e.g. display 212. This replaces the control panel information generated when the auto mode is disengaged. The paths are determined by dual path function 306. That is, the system performs data entry for two path calculations: provisional and active. A crew member enters the initial path data and engages. This path and targets are transferred to the auto-guidance and are "active". However, during taxi the crew may need to modify the path (e.g. a new gate assigned). In this case, a crew member pushes the provisional plan button to bring up the display shown in FIG. 5 and enters the required modifications. After returning to the control panel display FIG. 4, the provisional button (now lighted) is pushed again to activate the provisional plan. The new path now replaces the old and new target data is sent to the auto-guidance system. If not engaged within a predetermined period of time, (e.g. two minutes), the provisional plan is ignored and erased, and the button is no longer illuminated. If the crew accepts the auto-guidance path, Engage Electric Taxi 402 (FIG. 4) is activated, and AFC 205 transmits command information to electric/auto brake switch control 209, manual/auto switch control 207, and manual/auto nose wheel adapter 211 placing the aircraft in the auto-mode. AFC provides commands such as direction commands, which are then utilized to control a nose wheel steering mechanism 211 and manual tiller 64 is rendered inoperative. When electric/auto brake switch control 209 is placed in the auto-mode, auto brake controllers 602 receive commands, speed, and status signals from AFC 205 as to when to apply braking forces, rather than from manual brake control 604. AFC 205 places manual/auto switch control 207 in the auto mode, and the right and left electric taxi controllers 610 and 612, respectively, receive commands from controllers 610 and 612 rather than from manual controllers 606 and 608 on the flight deck; (e.g. joy sticks used to steer).

The landing process may be summarized as follows. Prior to landing, the crew may enter airport parameters. This information may be received, in whole or in part, via data link, if data link is enabled 406 (FIG. 4). If Enable Auto Landing 410 (FIG. 4) is activated prior to landing, Engage Auto Control occurs automatically after sensors detect a landing; (e.g. due to pressure on wheel switches), and the AFC has determined when to turn the engines off and the action is performed by the crew.

If auto landing is not engaged, upon landing and after safe braking, the crew engages auto control manually. It is assumed that at this point the APU (110 in FIG. 1) is on. The aircraft begins maneuvering in accordance with the taxi path shown on display 212 and generated by the auto guidance system. The crew monitors the displays and the path through the windows to confirm proper operation and to disengage or hold, if obstacles appear or there is a sudden change in circumstances; e.g. a blown tire. At a time determined by the electric taxi auto-guidance and control system, the crew receives an indication of the optimum time to shut down the engines. The aircraft follows the auto-path and approaches the gate area under auto control. The crew disengages auto-guidance for final gate approach and reverts to manual electric taxi control. If permitted by the airport, the crew may use auto guidance to proceed to the gate and park.

For takeoff, the crew first obtains taxi clearance and takeoff information. This may be obtained via voice or data link. Taxi clearance is provided to the VGS via flight crew entry or automatically from the data link. After turning on the APU 110 [FIG. 1], operation of the electric taxi system is verified. The aircraft is typically pushed-back manually and aligned to its initial position. The electric taxi auto guidance and control system is engaged and the aircraft begins maneuvering and taxi in accordance with the auto guidance system and the VFS. The crew monitors the displays and the terrain through the windows to confirm proper operation and to disengage or hold if obstacles appear or there is a sudden change in circumstances. If auto-avoid is engaged the system automatically detects hazards and may halt the system to provide additional safety. At a time determined by the auto-guidance function, the crew is alerted as to the optimum time to start the engines. At the appropriate time, the crew disengages the electric taxi and guidance control system and the electric taxi system, and starts the engines.

If auto-pushback is available, Engage Pushback 414 (FIG. 4) may be activated causing the aircraft to move back, turn, and align in the runway. It is to be noted that some aircraft configurations allow engine start while the electric taxi auto-guidance and control system is engaged. In this case, the crew received an indication of the optimum time to start engines. The auto guidance and electric taxi system may disengage automatically after engine start.

Figure 7:
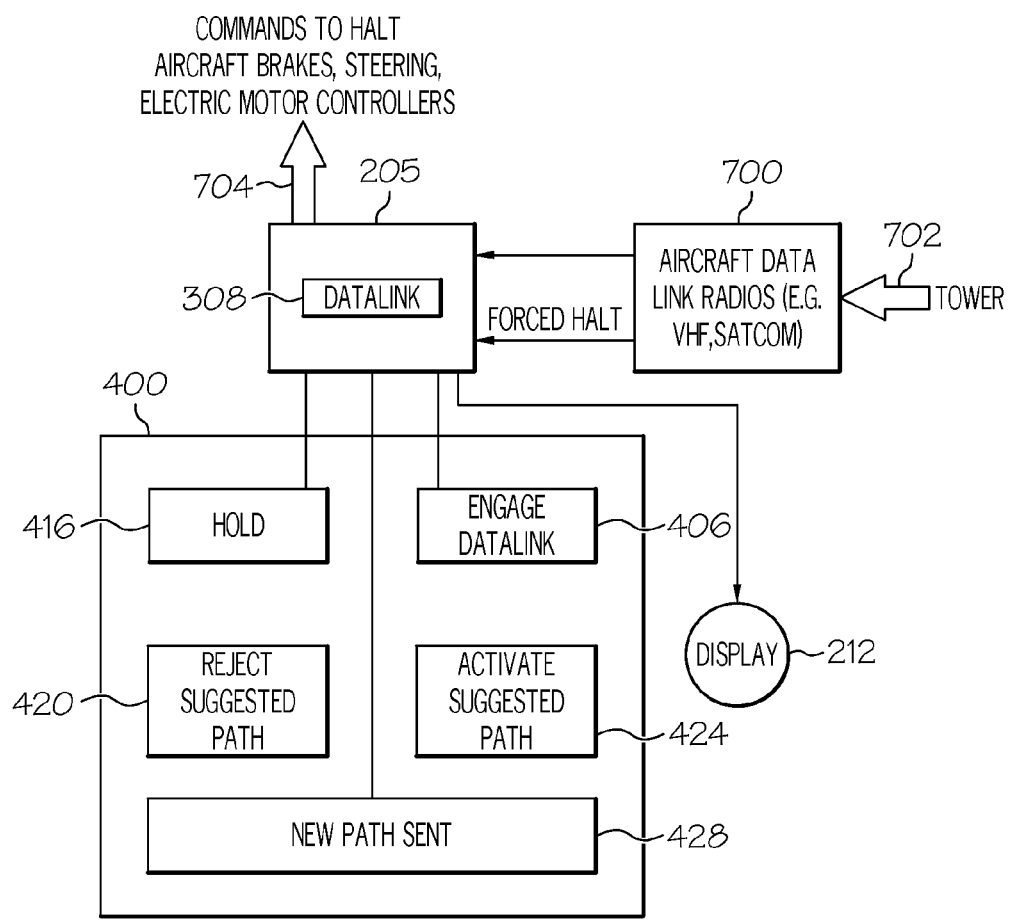
FIG. 7 is a block diagram illustrating the data link subfunction of the embodiment shown in FIG. 3.

FIG. 7 is a block diagram illustrating the operation of the data link sub-function 308 in ACF 205 when the tower commands a halt and then provides a new clearance. FIG. 7 shows a subset of the controls on control panel 400 shown in FIG. 4; i.e. Engage Data-Link 406, Hold 416, Reject Suggest Plan 420, Activate Suggested Plan 424, and Advisory Window 428 (in this case indicating that a new plan has been sent). Display 212 is also shown receiving data that originates in AFC 205 which contains data link sub-function 308. Also shown is aircraft data-link 700 for receiving information from an airport tower indicted by arrow 702. When the crew activates Engage Data Link 406, tower 702 can command a forced halt or provide a suggested plan. Data Link 308 provides the proper protocol and security to accept the halt command or crew response to accept/reject (424/420) the new suggested route. If a halt command is received, ACF 205 transmits the appropriate signals to the braking, steering, and electric controls. Furthermore, AFC 205 sends a warning to control panel 400 and to display 212. The suggested path sent via the data link is displayed on display 212 where the crew may accept it (Activate Suggested Plan 424) or reject it (Reject Suggested Plan 420).

Figure 8:
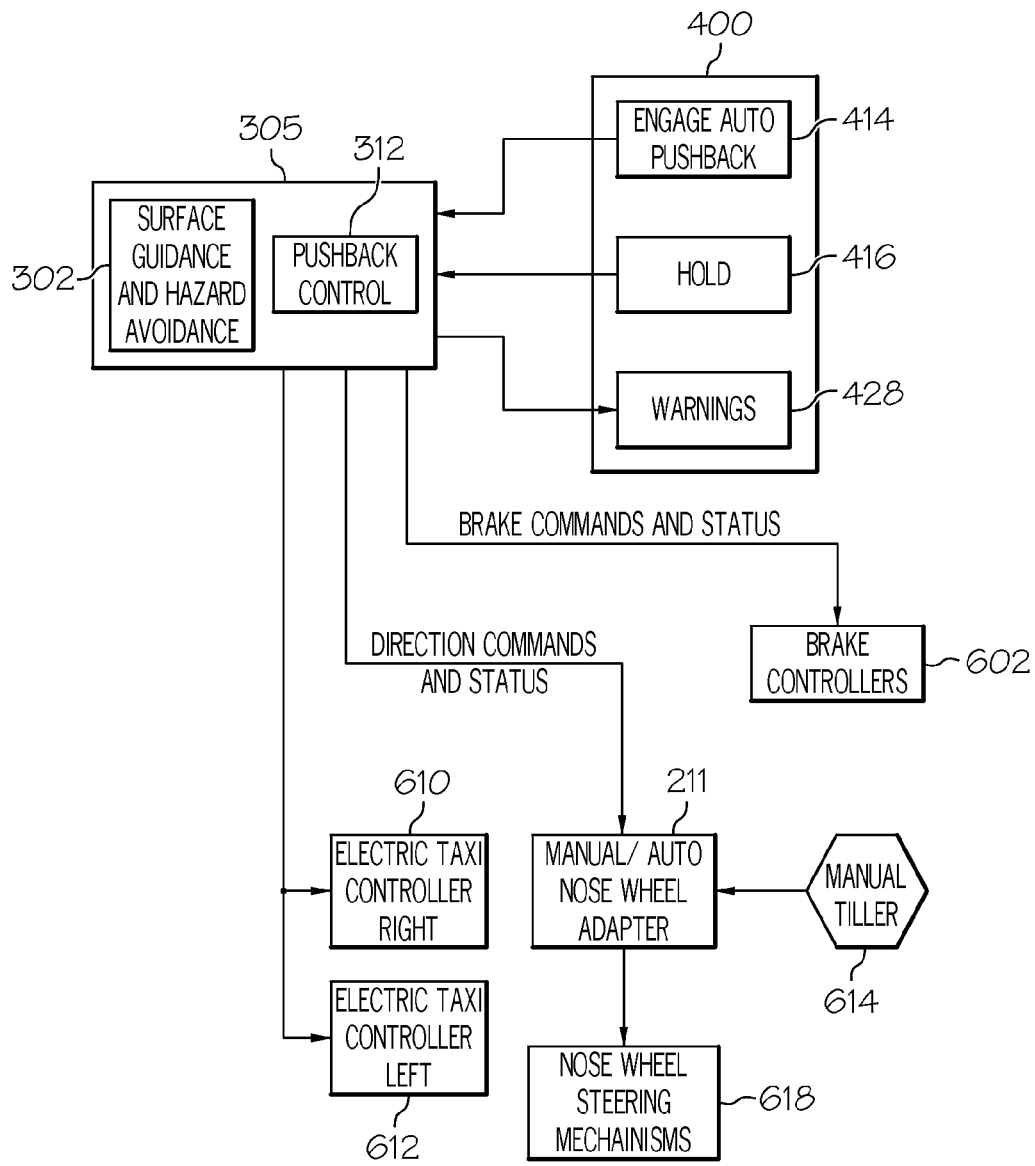
FIG. 8 is a block diagram illustrating the push back subfunction of the embodiment shown in FIG. 3.

FIG. 8 is a block diagram illustrating the operation of the pushback control sub-function 212 in AFC 205. Once again, a subset of the control panel 400 (FIG. 4) is shown in FIG. 8; i.e. Engage Auto Pushback 414, Hold 416, and Warning 410. In addition, data from Surface Guidance and Avoidance sub-function is available to Pushback Control sub-function 312. When the Engage Auto Pushback control 414 is activated, a signal is sent to AFC. The optimum path has already been calculated, and using this, the pushback control functions determine the additional commands needed to back the aircraft and turn the aircraft in the proper direction. After backup begins, the Surface Guidance and Hazard Avoidance signals are transmitted, if needed, to the brake controllers 602, electric taxi controllers 610 and 612, and nose wheel steering mechanism 618 if Auto Avoid is engaged. The aircraft moves back along the determined backup path, turns in the proper direction in accordance with the optimum path, and then halts. Hold light 416 turns on, the engage auto pushback light turns off, and warning panel 428 displays "Backup Complete". If satisfied, the crew activates the halt control 416, and auto-guidance along the guidance path continues.

If a collision is imminent, the aircraft halts, a warning is displayed identifying the hazard that caused the halt, and the backup discontinues. If the cause of the halt is removed, pushback is restored or the auto-guidance is disengaged, proceeding only with manual electric control.

The electric taxi auto-guidance control system provides for a number of interlocks. For example, a data link command from traffic control may cause a halt as will brake activation by a crew member when auto brake is activated. Furthermore, auto-control will disengage upon movement of the nose wheel steering tiller, excessive nose wheel angle, excessively low tire pressure, engine start, and excessive speed, parking brake set, change in flight configuration and the like. It is also contemplated that aircraft intent information be provided to neighboring aircraft and ground vehicles so as to enable to take maneuvers originated by the electric taxi auto-guidance and control system into account. This may be accomplished using surface collision avoidance systems, ADS-B, external signal lights, and the like.

Figure 9:
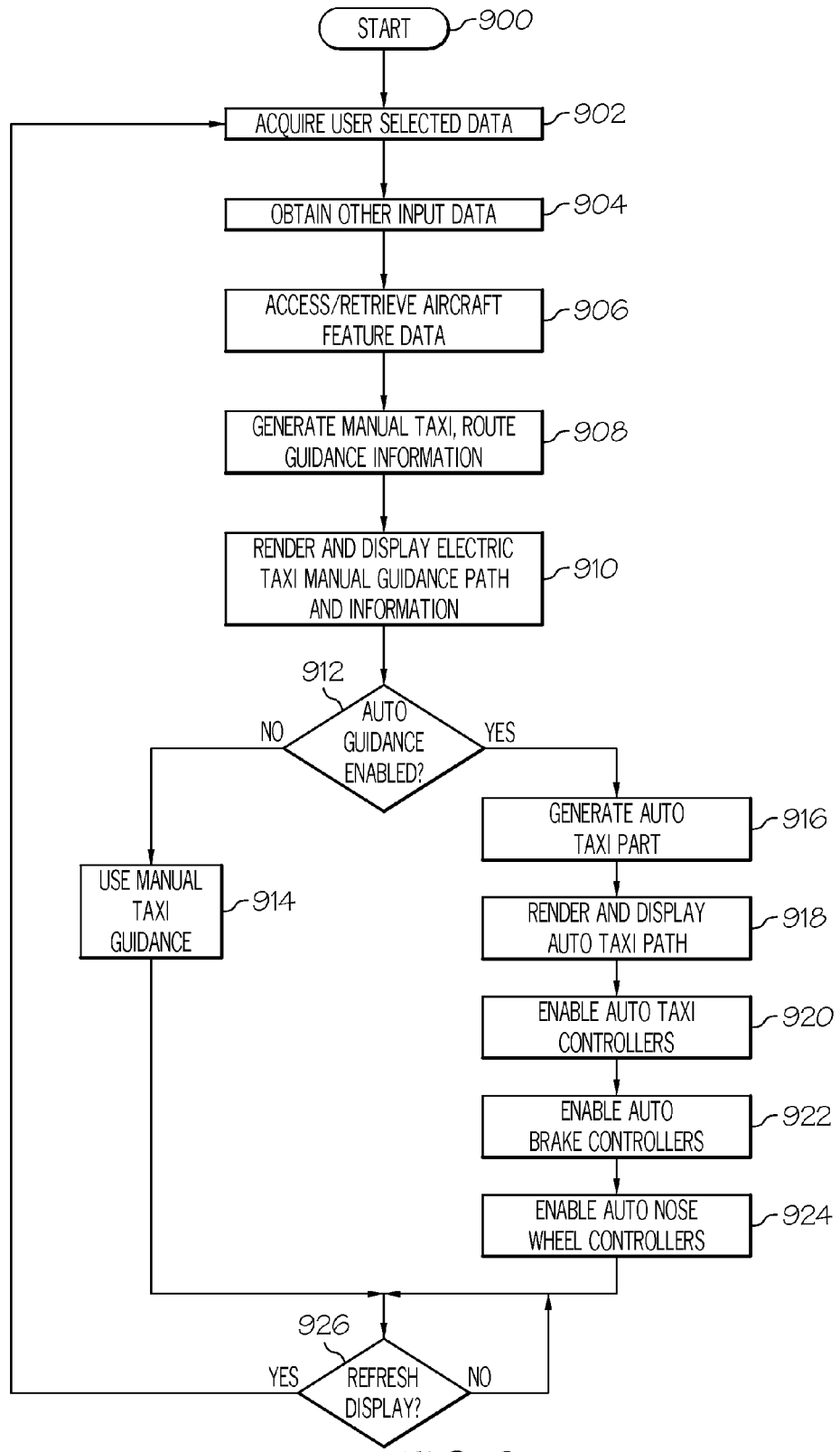
FIG. 9 is a flow chart illustrating an exemplary embodiment of an electric taxi auto guidance method.

FIG. 9 is a flow chart that illustrates an exemplary embodiment of an electric taxi auto-guidance process 900. The process 900 may be performed by an appropriate system or component of the host aircraft, such as the taxi guidance system 200 shown in FIG. 2. The various tasks performed in connection with process 900 may be performed by software, hardware, firmware, or any combination thereof. For illustrative purposes, the following description of the process 900 may refer to elements mentioned above in connection with FIG. 1-8. In practice, portions of the process 900 may be performed by different elements of the described system, e.g., the processor architecture 102, the ground management system 202, the symbology generation module 210, or the display system 212. It should be appreciated that the process 900 may include any number of additional or alternative tasks, the tasks shown in FIG. 9 need not be performed in the illustrated order, and the process 900 may be incorporated into a more comprehensive procedure or process having additional functionality not described in detail herein. Moreover, one or more of the tasks shown in FIG. 9 could be omitted from an embodiment of the process 900 as long as the intended overall functionality remains intact.

Although the auto-guidance process 900 could be performed or initiated at any time while the host aircraft is operating, this example assumes that the process 900 is performed after the aircraft has landed (or before takeoff). More specifically, the process 900 can be performed while the aircraft is in a taxi mode. The process 900 can be performed in a virtually continuous manner at a relatively high refresh rate. For example, iterations of the process 900 could be performed at a rate of 12-40 Hz (or higher) such that the synthetic flight deck display will be updated in real-time or substantially real time in a dynamic manner.

The auto-guidance process 900 obtains, receives, accesses, or acquires certain data and information that influences the generation and presentation of taxi guidance information. In this regard, the process may acquire certain types of user-selected or user-entered data as input data (task 902). The user input data may include any of the information specified above with referent to the user input device 234 (FIG. 2). For example, the process 900 may contemplate user-selected or user-identified gates, runways, traffic conditions, or the like. The process 900 may also obtain or receive other input data (task 904) that might influence the generation and presentation of taxi guidance information. Referring again to FIG. 2, the various elements, systems, and components that feed the taxi guidance system 200 may provide the other input data for task 904. In certain embodiments, this input data includes aircraft status data for the host aircraft (such as geographic position data, heading data, and the like) obtained from onboard sensors and detectors. The input data may also include data received from air traffic control via the data link subsystems 240 and 308 (FIG. 3). In some scenarios, the input data also includes neighboring aircraft status data for at least one neighboring aircraft in the airport field, which allows the taxi guidance system 200 to react to airport traffic that might impact the taxi operations of the host aircraft.

The auto-guidance process 900 accesses or retrieves airport feature data that is associated or otherwise indicative of synthetic graphical representations of the particular airport field (task 906). As explained above, the airport feature data might be maintained onboard the aircraft, and the airport feature data corresponds to, represents, or is indicative of certain visible and displayable features of the airport field of interest. The specific airport features data that will be used to render a given synthetic display will depend upon various factors, including the current geographic position and heading data of the aircraft.

The taxi auto-guidance system can process the user-entered input data, the other input data, and the airport feature data in an appropriate manner to generate taxi path guidance information (task 908) for the host aircraft, indicating start/stop guidance information for the primary thrust engine(s) and/or for the electric taxi system, and/or speed guidance information for the onboard electric taxi system, at the appropriate time and as needed. The resulting taxi path guidance information, start/stop guidance information, and speed guidance information will therefore be dynamically generated in response to the current input data, real-time operating conditions, the current aircraft position and status, and the like. Moreover, some or all of the generated guidance information may be influenced by the user-selected or user-entered data, by the neighboring aircraft data, or by the air traffic control data.

Although the electric taxi auto-guidance information could be conveyed, presented, or annunciated to the flight crew or pilot in different ways, the exemplary embodiment described here displays graphical representations of the taxi path guidance information, the engine start/stop guidance information, and the speed guidance information. Surface traffic, if available, can also be displayed along with the aircraft route at the airport. More specifically, the process 900 renders the electric taxi guidance information on a cockpit display. Accordingly, the process 900 may utilize the electric taxi guidance information to generate image rendering display commands that are then used to control the rendering and display of the airport field on the cockpit display (task 910). For this example, task 910 renders the display of the airport field in accordance with the current geographic position data of the host aircraft, the current heading data of the host aircraft, and the airport feature data. As the graphical representation of the airport field might include graphical features corresponding to taxiways, runways, taxiway/runway signage, the desired taxi path, and the like. A synthetic display may also include graphical representations of an engine on/off indicator and a target electric taxi speed indicator. In practice, a dynamic synthetic display may also include a synthetic perspective view of terrain near or on the airport field. In certain embodiments, the image rendering display commands may also be used to control the rendering of additional graphical features, such as flight instrumentation symbology, flight data symbology, or the like.

If the auto guidance option has not been selected (task 912), i.e. Engage Auto Control 404 (FIG. 4) has not been activated, the crew manually operates the aircraft and follows a best taxi route on a cockpit display with instructions as to how to best navigate the suggested taxi path (task 914). That is, the visual taxi system will make suggestions regarding speed, steering, when to turn thrust engines and electric drive taxi motors on and off, etc. If, however, auto guidance has been enabled, AFC 205 will generate a new auto-taxi path (task 916) which will replace the best manual taxi path on the cockpit display (task 918) with the auto-path generated by the AFC 205. As described earlier, the process continues with AFC 205 enabling the right and left electric taxi controllers 610 and 612 (task 920), brake controllers 602 (task 922) and the nose wheel auto-steering mechanism 618 (task 924).

If it is time to refresh the display (query task 926), then the process 900 leads back to task 902 to obtain updated input data. If not, then the current state of the display is maintained. The relatively high refresh rate of the process 900 results in a relatively seamless and immediate updating of the display. Thus, the process 900 is iteratively repeated to update the graphical representation of the airport field and its features, possibly along with other graphical elements of the synthetic display. Notably, the electric taxi guidance information may also be updated in an ongoing manner to reflect changes to the operating conditions, traffic conditions, air traffic control instructions, and the like. In practice, the process 900 can be repeated indefinitely and at any practical rate to support continuous and dynamic updating and refreshing of the display in real-time or virtually real-time. Frequent updating of the displays enables the flight crew to obtain and respond to the current operating situation in virtually real-time.

While at least one exemplary embodiment has been presented in the foregoing detailed description, it should be appreciated that a vast number of variations exist. For example, the techniques and methodologies presented here could also be deployed as part of a fully automated guidance system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An auto-guidance and control method for use on-board an aircraft in conjunction with an aircraft electric taxi drive system, comprising:
   obtaining aircraft status data;
   accessing airport feature data;
   generating, with a processor, taxi path guidance and control information including at least taxi speed guidance information and taxi direction information;
   sending commands derived from the taxi speed guidance information by the processor directly to at least one electric taxi controller to regulate the taxi speed of the aircraft; and
   applying steering commands derived from the taxi direction information by the processor directly to a nose wheel steering mechanism to steer the aircraft.

2. An auto-guidance and control method according to claim 1 wherein the taxi path guidance and control information includes at least braking information and further comprising applying braking commands derived from the braking information by the processor directly to electric taxi brake controllers.

3. An auto-guidance and control method according to claim 2 wherein the taxi path guidance and control information is cost optimized by the processor in regards to taxi cost.

4. An auto-guidance and control method according to claim 2 wherein the aircraft comprises a manual taxi steering mechanism and further comprising terminating auto-guidance upon activation of the manual steering mechanism.

5. An auto-guidance and control method according to claim 2 further comprising halting the aircraft while remaining engaged in auto-guidance.

6. An auto-guidance and control method according to claim 2 further comprising generating commands by the processor for performing auto-pushback of the aircraft from a gate.

7. An auto-guidance and control method according to claim 2 further comprising modifying the taxi path during taxi.

8. An auto-guidance and control method according to claim 2 further comprising receiving hazard data.

9. An auto-guidance and control method according to claim 8 further comprising generating commands to halt the aircraft when the processor detects a possible hazard.

10. An auto-guidance and control method according to claim 2 further comprising receiving ATC clearance via data link.

11. An auto-guidance method and control according to claim 2 further comprising generating a halt command upon receipt of an instruction from ATC.

12. An auto-guidance and control method according to claim 2 further comprising receiving a new path from ATC.

13. An auto-guidance and control method according to claim 2 further comprising displaying the path on a cockpit display.

14. A guidance and control system for use on-board an aircraft equipped with an electric taxi mechanism, the system comprising:
   a first source of aircraft status data;
   a second source of airport feature data;
   a third source of taxi direction information;
   a nose wheel steering mechanism;
   an electric taxi controller; and
   a processor coupled to the first, second, and third sources, to the electric taxi controller, and to the nose wheel steering mechanism and configured to (1) generate taxi path guidance and control information including at least taxi speed guidance information and taxi direction information, and (2) send commands derived from the taxi speed guidance information directly to the electric taxi controller and to the nose wheel steering mechanism.

15. A guidance and control system according to claim 14 further comprising an electric taxi brake controller coupled to the processor, wherein the taxi path guidance information includes at least braking information, and wherein the processor is further configured to send commands to the braking controller.

16. A guidance and control system according to claim 15 further comprising a manual taxi steering mechanism and wherein the processor is further configured to terminate auto-guidance upon activation of the manual steering mechanism.

17. A guidance and control system according to claim 14 wherein the processor is further configured to receive hazard data.

18. A guidance and control system according to claim 14 wherein the processor is further configured to halt the aircraft upon detection of possible collision by the processor.

19. A guidance and control system according to claim 14 wherein the processor is configured to modify the taxi path during taxi.

* * * * *